ically heating. After a few
United States Patent Office 3,058,978
Patented Oct. 16, 1962

3,058,978
NEW PHOTO-SENSITIZING DYESTUFFS
Ludwig W. Berlin and Heinrich Hamal, Frankfurt am Main, Germany, assignors to Farbwerke Hoechst Aktiengesellschaft vormals Meister Lucius & Brüning, Frankfurt am Main, Germany, a corporation of Germany
No Drawing. Filed June 21, 1960, Ser. No. 37,582
Claims priority, application Germany June 27, 1959
4 Claims. (Cl. 260—240.6)

The present invention provides valuable new photo-sensitizing dyestuffs, more particularly it relates to dyestuffs corresponding to the following general formulae:

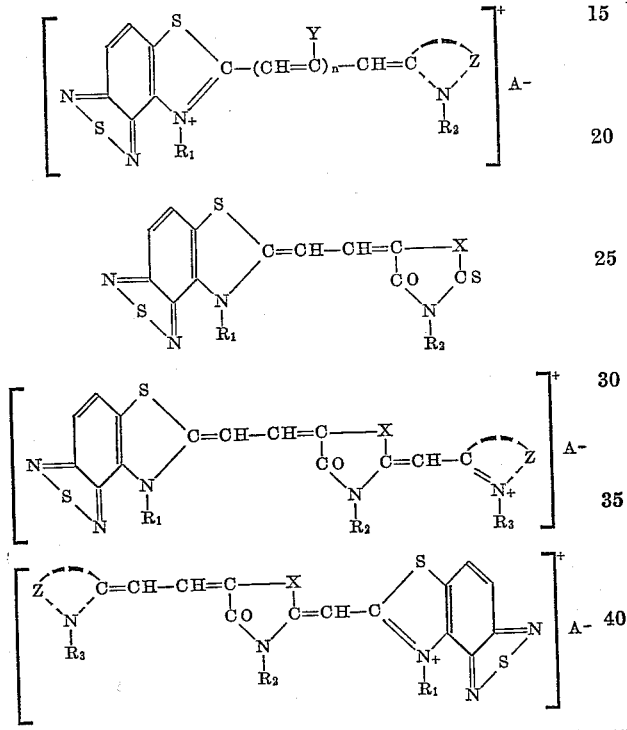

in which A represents the negative radical of an inorganic acid, X represents O or S, Y represents hydrogen or alkyl, $R_1$, $R_2$ and $R_3$ represent lower alkyl groups, Z represents the atomic groupings necessary to complete a heterocyclic ring system, and $n$ represents an integer from 0 to 3.

It is known that photo-sensitizing dyestuffs of the cyanine, styryl, merocyanine and rhodacyanine series can be made from quaternary salts of heterocyclic bases, so-called cyclammonium compounds. These compounds are condensed by known methods with, for example, an ortho-alkyl ester of an aliphatic carboxylic acid or a dialkylamino-benzaldehyde or a methylene-omega-aldehyde of the heterocyclic series, or with an intermediate compound which is formed in the synthesis of such aldehyde. For making these dyestuffs, there may also be used heterocyclic bases containing an acetanilidomethylene group and corresponding to the general formula

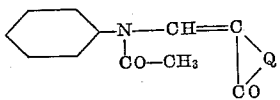

in which Q represents the atomic grouping necessary to complete a heterocyclic ketomethylene ring system.

When unsymmetrical carbocyanines are prepared, there are used as starting materials thioethers corresponding to the following general formula

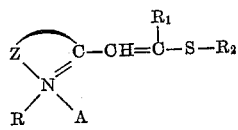

in which R and $R_2$ represent alkyl groups, $R_1$ stands for hydrogen or alkyl, A represents the radical of an acid and Z represents the atomic grouping necessary to complete a heterocyclic ring system.

Monomethinecyanines, for example, pseudocyanines, are generally prepared in such a manner that instead of the above-mentioned methylene-omega-aldehydes there are used the 2-alkyl-mercapto compounds of heterocyclic bases corresponding to the following general formula

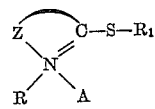

in which R and $R_1$ represent alkyl groups and A and Z have the same meaning as indicated in the above Formula I.

Now we have found that valuable new photo-sensitizing dyestuffs, which are particularly suitable for sensitizing silver halide emulsions are obtained by using in one of the known processes as a cyclammonium compound a quaternary salt of 2-methyl-4,5-thia-diazolo-2,1,3-benzthiazole corresponding to the following formula

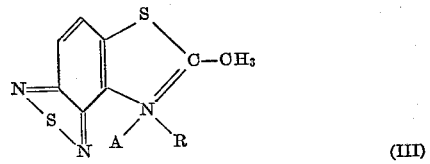

in which R represents an alkyl group and A the radical of an acid. The new amino compound on which Formula III is based is prepared by first nitrating the known piazthiole and then catalytically reducing the nitro compound obtained according to the following reaction scheme

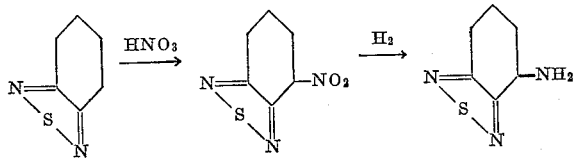

Cf. Z. obsc. Chim 23 (1953) page 1552 and 25 (1955) page 199.

The amine so obtained can be acetylated in the following manner:

30 cc. of acetic anhydride are added to 15.1 grams of 4-amino-benzo-2,1,3-thiadiazole whereby complete dissolution occurs with spontaneous heating. After a few minutes the acetyl compound begins to separate. In order to complete the reaction, the whole is heated for 15 minutes on the steam bath. After cooling to 50° C., the product is precipitated with 100 cc. of water, filtered off with suction while ice-cold, washed with water and dried at 70° C. The 4-acetylamino-benzo-2,1,3-thiadiazole corresponding to the following formula

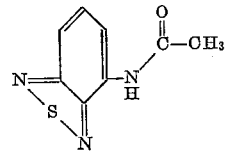

forms lustrous pale yellow-colored crystal flakes melting at 152–153° C.

The acetyl compound can be converted into the corresponding thioketone in the following manner:

19.3 grams of 4-acetylamino-benzo-2,1,3-thiadiazole and 200 cc. of dioxan are heated to 80–85° C., while stirring. After the addition of 22.5 grams of phosphorus pentasulfide, the whole is further stirred for 10 minutes at 85–90° C., filtered off with suction, while hot, rinsed with 50 cc. of dioxan and, after cooling, precipitated with 1000 cc. of water. The reaction product is filtered off with suction while ice-cold and recrystallized from water. The 4-thioacetylaminobenzo-2,1,3-thiadiazole corresponding to the following formula

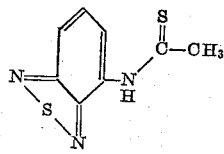

forms slightly felted small lemon-yellow needles melting at 99–100° C.

The ring closure of the thioketone to obtain the 2-methyl-4,5-thiadiazolo-2,1,3-benzthiazole may be carried out as follows:

20.9 grams of 4-thioacetylamino-benzo-,2,1,3-thiadiazole are introduced into a solution of 20 grams of sodium hydroxide in 400 cc. of water and dissolved by gently heating the mixture. The clear yellow solution so obtained is run at 20–30° C., while stirring, into a solution of 66 grams of potassium ferricyanide in 200 cc. of water. After some minutes the crystalline base begins to separate. The reaction mixture is stirred for 30 minutes at 20–30° C., filtered off with suction, washed with water and dried at 70–80° C. The reaction product is purified by recrystallization from diisopropyl ether. The pure 2-methyl-4,5-thiadiazolo-2,1,3-benzthiazole corresponding to the following formula

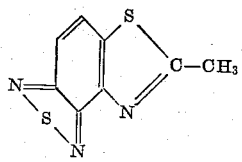

forms small colorless prisms melting at 165–166° C.

This compound is converted into the 2-methyl-4,5-thiadiazolo-2,1,3-benzthiazolium-ethyliodide by heating to 100–110° C. in a melting tube molecular quantities of 2-methyl-4,5-thiadiazolo-2,1,3-benzthiazole with ethyl iodide. The quaternate forms a yellowish crystal powder which decomposes at 199–200° C.

The following examples serve to illustrate the invention but they are not intended to limit it thereto:

EXAMPLE 1

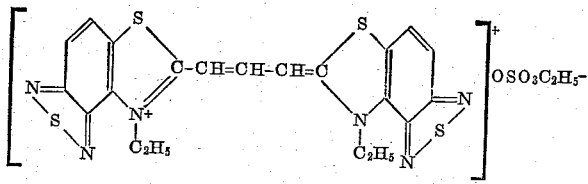

1.04 grams of 2-methyl-4,5-thiadiazolo-2,1,3-benzthiazole and 0.65 cc. of diethyl sulfate are heated at 125–130° C. for 1 hour. The melt obtained is dissolved in a mixture of 10 cc. of pyridine, 1.7 cc. of ortho-formic acid triethyl ester and 1.2 cc. of glacial acetic acid, heated at the boil and boiled for 1 hour under reflux. After cooling in the ice-bath, the dyestuff precipitated in crystalline form is filtered off with suction and washed with acetone. After recrystallization from methanol, there are obtained small crystal lamellae having a bronze lustre, which melt at 274–275° C. with decomposition. The dyestuff produces an absorption maximum in methanol at about 5950 Angstrom and a sensitization maximum at 6320 Angstrom.

EXAMPLE 2

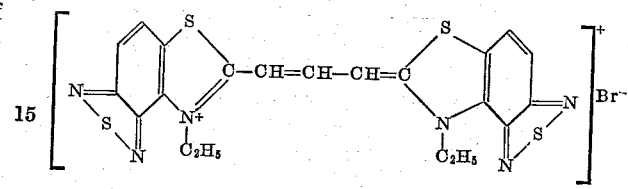

2 grams of the crude dyestuff described in Example 1 are dissolved in 400 cc. of hot methanol and, after cooling, precipitated with a solution of 2.5 grams of potassium bromide in 200 cc. of water. The precipitated bromide of the dyestuff is filtered off with suction, washed with water and dried at 50–60° C. under reduced pressure. After recrystallization from methanol, the pure dyestuff is obtained in the form of small lustrous crystals which melt at 262–263° C. with decomposition. The dyestuff produces a sensitization maximum in methanol at 6320 Angstrom.

EXAMPLE 3

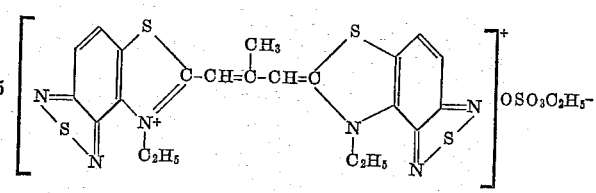

1.04 grams of 2-methyl-4,5-thiadiazolo-2,1,3-benzthiazole and 0.65 cc. of diethyl sulfate are heated at 125–130° C. for 1 hour. The melt obtained is heated to boiling, while stirring, in a mixture of 10 cc. of pyridine, 1.8 cc. of ortho-acetic acid triethyl-ester and 1.2 cc. of glacial acetic acid, and boiled for 1 hour under reflux. After cooling in the ice-bath, the product is filtered off with suction, washed with acetone and dried. After recrystallization from methanol, the dyestuff is obtained in the form of gray-colored lustrous small crystal needles melting at 279–280° C. with decomposition. The dyestuff produces an absorption maximum in methanol at about 5750 Angstrom and a sensitization maximum at 6150 Angstrom.

EXAMPLE 4

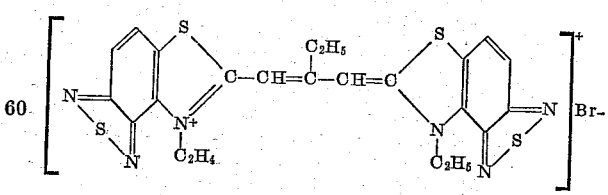

1.04 grams of 2-methyl-4,5-thiadiazolo-benzthiazole and 0.65 cc. of diethyl sulfate are heated at 125–130° C. for 1 hour. The melt obtained is dissolved in a mixture of 10 cc. of pyridine, 2 cc. of ortho-propionic acid triethyl ester and 1.2 cc. of glacial acetic acid, heated to boiling and boiled for 1 hour under reflux. The hot reaction product is precipitated with a solution of 0.9 gram of anilinium hydrobromide in 2 cc. of pyridine and filtered off with suction at about 40–50° C. The crystalline crude product so obtained is washed with acetone and recrystallized from methanol. The pure dyestuff is a crystal powder having a bronze lustre, which melts at 268–269° C. with decomposition. The dyestuff produces an absorption maximum in methanol at about 5800 Angstrom and a sensitization maximum at 6150 Angstrom.

EXAMPLE 5

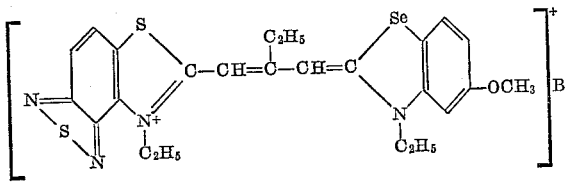

1.04 grams of 2-methyl-4,5-thiadiazolo-2,1,3-benzthiazole and 0.65 cc. of diethyl sulfate are heated at 125–130° C. for 1 hour. The quaternate obtained is dissolved in 30 cc. of ethanol and mixed with 2.1 grams of 2-(β-methylmercapto-butenyl)-3-ethyl-5-methoxy - benzselenazolium bromide. The mixture is heated to boiling and, after the addition of 0.7 cc. of triethylamine, boiled for 30 minutes under reflux. After cooling in an ice-bath, the product is filtered off with suction, washed with acetone and dried. After recrystallization from methanol, the dyestuff is obtained in the form of small crystals having a brass lustre which melt at 257–258° C. with decomposition. The dyestuff produces an absorption maximum in methanol at about 5800 Angstrom and a sensitization maximum at 6180 Angstrom.

EXAMPLE 6

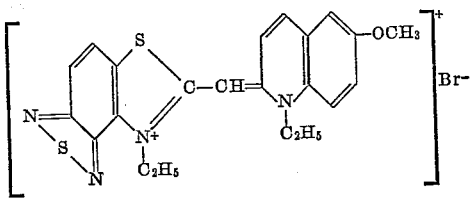

1.04 grams of 2-methyl-4,5-thiadiazolo-2,1,3-benzthiazole and 0.65 cc. of diethyl sulfate are heated at 125–130° C. for 1 hour. The quaternate obtained is dissolved in 40 cc. of ethanol, mixed with 1.64 grams of 1-ethyl-2-ethio-6-methoxy-quinolinium bromide and heated to boiling. After the addition of 0.7 cc. of triethylamine, the whole is boiled for a further 30 minutes under reflux. After cooling, the crude product is filtered off with suction, washed with acetone and recrystallized from methanol. The pure dyestuff forms yellow-red felted small needles which melt at 275–276° C. with decomposition. The dyestuff produces an absorption maximum in methanol at about 5150 Angstrom and a sensitization maximum at 5420 Angstrom with a secondary maximum at 5620 Angstrom.

EXAMPLE 7

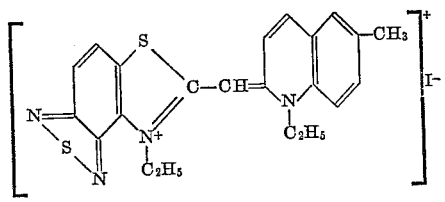

1.04 grams of 2-methyl-4,5-thiadiazolo-2,1,3-benzthiazole and 0.65 cc. of diethyl sulfate are heated at 125–130° C. for 1 hour. The melt obtained is dissolved in 60 cc. of ethanol, mixed with 1.8 grams of 1-ethyl-2-ethio-6-methyl-quinolinium iodide and heated to boiling. After the addition of 0.7 cc. of triethylamine, the whole is boiled for a further 30 minutes under reflux. After cooling, the reaction product is filtered off with suction, washed with acetone and dried. After recrystallization from methanol, fine yellow-red small needles are obtained which melt at 273–274° C. with decomposition. The dyestuff produces an absorption maximum in methanol at about 5100 Angstrom and a sensitization maximum at 5400 Angstrom.

EXAMPLE 8

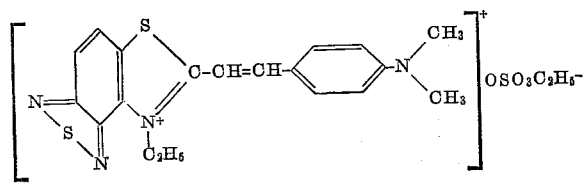

1.04 grams of 2-methyl-4,5-thiadiazolo-2,1,3-benzthiazole and 0.65 cc. of diethyl sulfate are heated at 125–130° C. for 1 hour. The melt obtained is dissolved in 15 cc. of pyridine and, after the addition of 0.75 gram of para-dimethylamino-benzaldehyde and 1.2 cc. of glacial acetic acid, the mixture is heated to boiling and heated for 30 minutes under reflux. After cooling in the ice-bath, the crystalline crude product is filtered off with suction and washed with acetone. The product is purified by recrystallization from methanol. The pure dyestuff is obtained in the form of gray-shining small crystal needles which melt at 248–250° C. with decomposition. It produces an absorption maximum in methanol at about 5500 Angstrom.

EXAMPLE 9

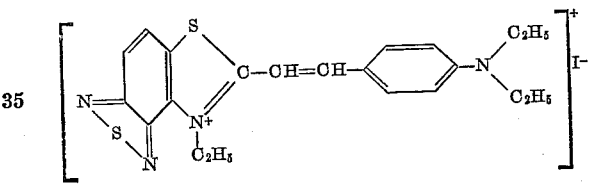

1.04 grams of 2-methyl-4,5-thiadiazolo-2,1,3-benzthiazole and 0.65 cc. of diethyl sulfate are heated at 125–130° C. for 1 hour. The melt is dissolved in 15 cc. of pyridine and heated to boiling after the addition of 0.89 gram of para-diethylamino-benzaldehyde and 1.2 cc. of glacial acetic acid. The mixture is boiled for 30 minutes under reflux and, after cooling to about 40° C., mixed with 30 cc. of acetone. After being allowed to stand for a prolonged time, the dyestuff sulfonate crystallizes out. It is filtered off with suction, washed with acetont and dried. In order to convert the product into the iodide, it is dissolved in a small quantity of methanol and precipitated with a solution of sodium iodide in methanol. The iodide so obtained is purified by recrystallization from methanol. The pure dyestuff is obtained in the form of small needles having a grey-green lustre, which melt at 235–236° C. with decomposition. It produces an absorption maximum in methanol at about 5600 Angstrom and a sensitization maximum at 6070 Angstrom.

EXAMPLE 10

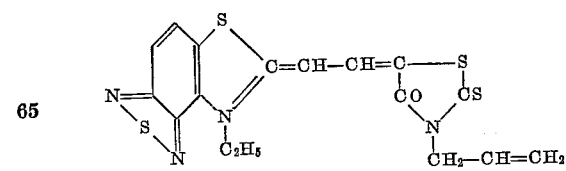

1.04 grams of 2-methyl-4,5-thiadiazolo-2,1,3-benzthiazole and 0.65 cc. of diethyl sulfate are heated at 125–130° C. for 1 hour. The melt is dissolved in 60 cc. of ethanol and mixed with 1.59 grams of 5-acetanilino-methylene-3-allylrhodanine. The mixture is heated to boiling, mixed with 0.7 cc. of triethylamine and boiled for 30 minutes under reflux. After cooling, the separated dyestuff is filtered off with suction, washed with methanol and dried. The product is purified by recrystallization from a mixture of pyridine and methanol. The pure dyestuff is obtained in the form of brass-green lustrous small crystals which melt at 257–258° C. with decomposition. It produces an absorption maximum in methanol at about 5550 Angstrom and a sensitization maximum at 6100 Angstrom.

EXAMPLE 11

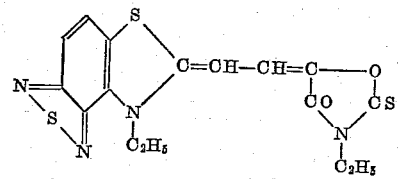

1.04 grams of 2-methyl-4,5-thiadiazolo-2,1,3-benzthiazole and 0.65 cc. of diethyl sulfate are heated at 125–130° C. for 1 hour. The melt is dissolved in 60 cc. of ethanol, mixed with 1.45 grams of 5-acetanilino-methylene-3-ethylthio-oxazolidone and heated to boiling. After the addition of 0.7 cc. of triethylamine, the mixture is boiled for 30 minutes under reflux. After cooling, the reaction product is filtered off with suction and washed with methanol. The product is purified by recrystallization from a mixture of chloroform and methanol. The pure dyestuff is obtained in the form of reddish brown small crystal lamellae having a violet surface lustre. It produces an absorption maximum in methanol at 5350 Angstrom and a sensitization maximum at 5830 Angstrom.

EXAMPLE 12

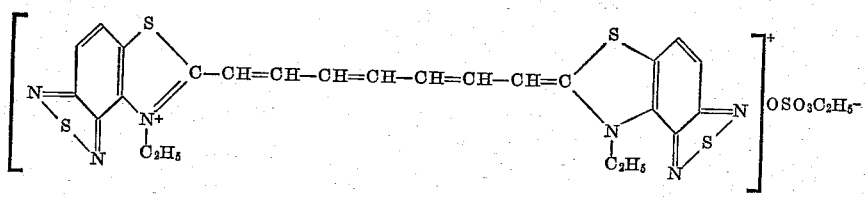

1.25 grams of 2-methyl-4,5-thiadiazolo-2,1,3-benzthiazole and 0.78 cc. of diethyl sulfate are heated at 125–130° C. for 1 hour. The melt obtained is dissolved in 5 cc. of hot ethanol, mixed with 0.71 gram of glutacondianilo hydrochloride and heated to boiling. After the addition of 0.84 cc. of triethylamine, the mixture is boiled for 5 minutes under reflux, mixed with 20 cc. of methanol and cooled in an ice-bath. The separated dyestuff is filtered off with suction and washed with methanol. It is purified by boiling again with methanol. A fine crystal powder having a brass lustre is obtained which melts at 188–189° C. with decomposition. The methanolic solution the dyestuff produces an absorption maximum in the near infrared.

EXAMPLE 13

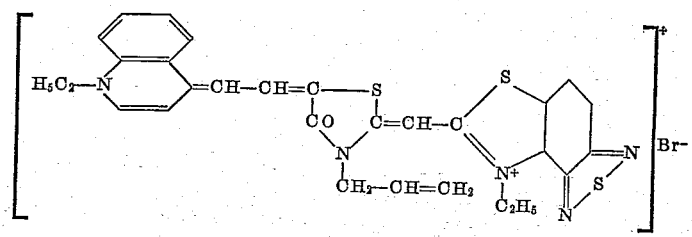

The merocyanine of Formula I below used as starting material is prepared by known methods in the following manner: 18.6 grams of 1-ethylquinoline-4-ω-methylenealdehyde and 17.3 grams of 3-ethyl-rhodanine are dissolved in 30 cc. of pyridine and mixed with 10 cc. of acetic anhydride, while stirring. The temperature rises to 30–35° C. The whole is stirred for 30 minutes at this temperature. When the product has been allowed to stand for several hours, it is filtered off with suction, washed with methanol and dried. There are obtained strongly felted blue-violet long needles which melt at 234–235° C. with decomposition. The product corresponds to the following formula

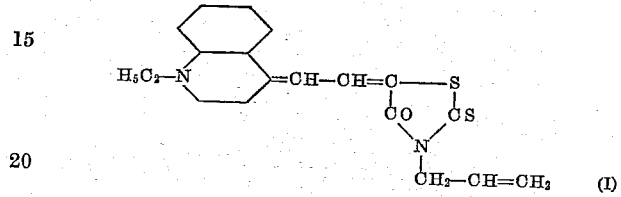

In order to obtain the rhodacyanine by further condensation, the above merocyanine is quaternated as follows: 1.77 grams of the merocyanine are introduced, within 5 minutes, into 5 cc. of dimethylsulfate heated to 90–95° C. A temperature of 90–95° C. is maintained for a further 15 minutes, the product is cooled and triturated several times with ether in order to remove the dimethyl sulfate in excess.

For the preparation of the rhodacyanine 1.04 grams of 2-methyl-4,5-thiadiazolo-2,1,3-benzthiazole and 0.65 cc. of diethyl sulfate are heated at 125–130° C. for 1 hour. The melt obtained is dissolved together with the quaternate obtained from the merocyanine in 50 cc. of pyridine, heated to boiling and boiled for 30 minutes under reflux. After the addition of 30 cc. of methanol, the mixture is cooled and the dyestuff sulfonate separated in the form of small prisms having a copper lustre is filtered off with suction. The product is washed with methanol and dried. In order to convert the dyestuff into the bromide, it is dissolved in boiling methanol, mixed with a solution of 1.5 grams of anilinium bromide in a small quantity of methanol and concentrated to a large extent. The separated dyestuff bromide is filtered off with suction and recrystallized again from methanol. Small prisms having a copper lustre are obtained which melt at 262–264° C. with decomposition. The dyestuff produces an absorption maximum in methanol at about 6750 Angstrom.

EXAMPLE 14

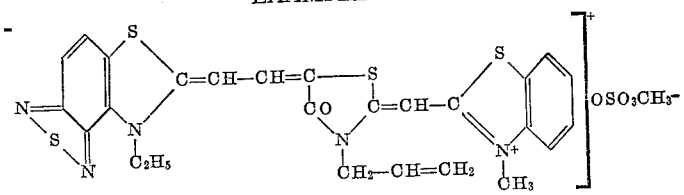

2.09 grams of the merocyanine described in Example 10 are introduced, within 10 minutes, into 25 cc. of dimethyl sulfate which has been heated to 110° C. The mixture is then heated at 110–115° C. for 15 minutes. After cooling, the reaction product is triturated several times with ether in order to remove the dimethyl sulfate in excess. The quaternate so obtained is dissolved in 250 cc. of ethanol, mixed with 1.38 grams of 2-methyl-benzthiazole-dimethylsulfonate and heated to boiling. After the addition of 1.4 cc. of triethylamine, the mixture is boiled for 30 minutes under reflux. The separated dyestuff is filtered off with suction, while hot, and washed first with acetone and then with methanol. The product is purified by recrystallization from methanol. Grey-violet crystals having a copper-colored surface lustre are obtained, which melt at 306–308° C. with decomposition. In methanolic solution the dyestuff produces an absorption maximum at 6100 Angstrom.

We claim:
1. A photo-sensitizing dyestuff of the formula

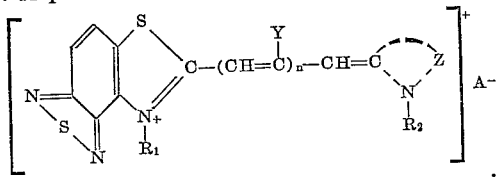

in which A represents a member of the group consisting of Br, I, $OSO_3CH_3$ and $OSO_3C_2H_5$, Y represents a member of the group consisting of hydrogen and lower alkyl, $R_1$ and $R_2$ represent lower alkyl groups, Z represents the atomic groupings necessary to complete a heterocyclic ring of the group consisting of benzothiazole, benzoselenazole and quinoline rings, and $n$ represents an integer from 0 to 3, inclusive.

2. The photo-sensitizing dyestuff of the formula

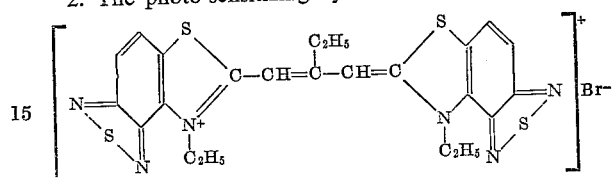

3. The photo-sensitizing dyestuff of the formula

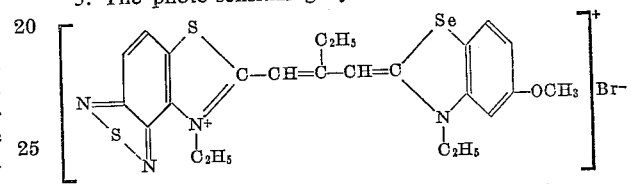

4. The photo-sensitizing dyestuff of the formula

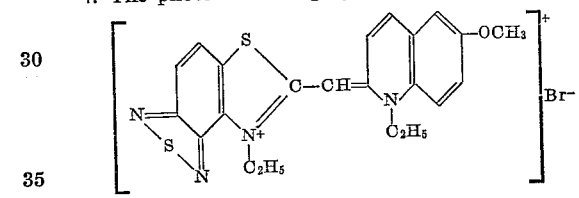

References Cited in the file of this patent
UNITED STATES PATENTS 2,194,213    Willmanns et al. -------- Mar. 19, 1940
2,202,990    Middleton et al. --------- June 4, 1940

OTHER REFERENCES

Pesin et al.: Zhur Obschei Khim, vol. 28, pages 383–8 (1958).